United States Patent Office 2,895,931
Patented July 21, 1959

2,895,931
METHOD FOR PREPARATION OF 3,3-DISUBSTITUTED OXETANE POLYMERS

Eugene D. Klug, Wilmington, Del., assignor to Hercules Powder Company, Wilmington, Del., a corporation of Delaware No Drawing. Application March 31, 1958
Serial No. 724,807

5 Claims. (Cl. 260—2)

This invention relates to an improved method for the preparation of polymers of 3,3-disubstituted oxetanes, also known as 3,3-disubstituted oxacyclobutanes, and, more particularly, to the preparation of polymers of 3,3-bis(chloromethyl)oxetane.

It is known that certain oxetanes, namely, 3,3-disubstituted oxetanes and, particularly, 3,3-bis(chloromethyl)-oxetane, may be polymerized to give high molecular weight polymers having a molecular weight of at least 10,000 and having physical properties which are highly desirable as applied to the broad field of use for such polymeric materials. However, heretofore, 3,3-bis(chloromethyl)oxetane has been polymerized using Friedel-Crafts catalysts, such as boron trifluoride etherate, aluminum chloride and others, at temperatures between −80° C. and 150° C. to obtain high molecular weight products. Under these conditions, it has been established and disclosed that the higher molecular weight products, suitable for plastics use, for example, were obtained ony when the polymerization was carried out at room temperature or considerably below. Needless to say, the requirement of such conditions has seriously detracted from the efficacy of the process and exploitation of its end products as well as imposing limitations in respect to versatility in end product application.

Now, in accordance with this invention, it has been discovered that the polymerization of 3,3-disubstituted oxetane may be carried out in the presence of at least one catalyst of the group consisting of aluminum hydride and aluminum amalgam.

The following examples will serve to illustrate the preparation of polymers from monomers of 3,3-disubstituted oxetanes and, particularly, 3,3-bis(chloromethyl)oxetane in accordance with this invention. All parts and percentages are by weight throughout the specification unless otherwise designated.

EXAMPLES 1–3

A series of polymerization reactions using various amounts of aluminum hydride catalyst was conducted in accordance with this invention. These reactions were carried out by heating for 10 minutes at 150° C. 3,3-bis-(chloromethyl)oxetane monomer with the catalyst in a closed reaction vessel containing an atmosphere of nitrogen. The amount of catalyst, percent conversion and specific viscosity are given in the following table.

Table.—Polymerization of 3,3-bis(chloromethyl)oxetane

| Example No. | AlH₃ | | Percent polymerized [1] | Specific viscosity [2] |
|---|---|---|---|---|
| | Weight, percent | Mol., percent | | |
| 1 | .032 | .16 | 96.0 | 0.61 |
| 2 | .048 | .24 | 82.8 | 0.25 |
| 3 | .072 | .36 | 93.7 | 0.41 |

[1] Calculated as the nonvolatile product remaining after subjecting the polymerization product to distillation at 170° C. and a pressure of 1 to 5×10⁻⁴ cm. of Hg in a molecular still.
[2] Determined on a 1% solution in cyclohexanone at 50° C.

EXAMPLE 4

To 10 cc. of 0.5% aqueous HgCl₂ was added 0.5 g. atomized aluminum. Gas bubbles rose from the metal almost immediately. After 2 minutes, the HgCl₂ solution was decanted and the metal washed several times with distilled water. The water was removed by washing successively with methanol, hexane, and 3,3-bis(chloromethyl)oxetane monomer. The volume of the monomer over the aluminum amalgam thus produced was adjusted to 10.0 ml. It was heated under pressure in the absence of air for 8 minutes at 150° C., and the resulting product contained 83.6% polymer and had a specific viscosity of 1.0 with the monomer content and specific viscosity determined as set forth in the preceding table.

With reference to the above examples, it will be seen that this invention provides an expeditious method of polymerizing 3,3-disubstituted oxetanes at low catalyst level. Although it is not intended that the invention shall be limited to any particular theory of operation, it appears well established that the catalysis involved in accordance with this invention is radically different from the conventional Friedel-Crafts catalysis which heretofore has been utilized for the preparation of polyoxetanes and, particularly, 3,3-bis(chloromethyl)oxetane. This is evident since high polymerization temperatures with a low level of catalyst concentration may be used to obtain high molecular weight products. Additionally, the catalysts of this invention are substantially insoluble in 3,3-bis-(chloromethyl)oxetane monomer and may be used in fixed bed polymerizations wherein no appreciable catalyst quantity is carried into the product polymer.

The amount of catalyst or mixture thereof to be utilized based by weight of the monomer may be varied from about 25 to about 10,000 p.p.m. although no particular advantage accrues at the latter upper limit or even higher as heretofore explained in relation to the unique catalyst mechanism involved. Moreover, the term "aluminum hydride" as used herein is chemically defined as AlH₃ and may be prepared as described by Chizinsky, Evans, Gibb and Rice, J. Am. Chem. Soc., vol. 77, page 3164 (1955). See also Encyclopedia of Chemical Technology, vol. 1, page 639, Interscience Publishers, 1947. "Aluminum amalgam" as used herein is a compound of aluminum and mercury prepared as set forth hereinabove, and is commonly used as a reducing agent in organic reactions. See L. F. Fieser, Experiments in Organic Chemistry, page 20, Heath, 1955; also Organic Synthesis, vol. 2, page 233, A. H. Blatt, editor, John Wiley and Sons, 1943.

Although the exact chemical composition of aluminum amalgam has never been clearly defined in the literature, it is believed that the surface of the aluminum particles is amalgamated, and that the bulk of the aluminum which is in excess simply acts as a carrier or support for the amalgam. However, for the purposes of the present invention it has been found unnecessary to define the precise stoichiometric relationship of aluminum and mercury in the amalgam layer. For operability of the invention, it has been found sufficient to define the limits of catalyst concentration in terms of parts per million (p.p.m.) of mercury. Since mercury has an atomic weight of 200 compared to 27 for aluminum, the values are not appreciably different as far as the catalysis is concerned whether the compound AlHg or AlHg₃ were assumed. For example, in Example 4 the concentration of Hg based on the monomer is 0.37% or 3700 p.p.m. This corresponds to 4200 p.p.m. as AlHg, and to 3867 p.p.m. as AlHg₃.

The polymerization temperature in accordance with this invention may be varied over a wide range as, for example, from about 100° to about 275° C. However, since polymerizations according to this invention may be carried out at elevated temperatures, a temperature range from about 150° to about 225° C. usually will be employed. The polymerization reaction may be carried out in either an open or closed vessel, and the exclusion of excessive moisture and air has been found necessary. However, for the best polymer properties and polymerization performance anaerobic and anhydrous conditions are utilized. Under conditions where diluent polymerization reactions are desired, the diluents of utility are those that do not react either with the monomer or the catalyst. Such diluents include hydrocarbons such as heptane, decane or dodecane and halogenated hydrocarbons such as carbon tetrachloride, tetrachloroethane and trifluoro-1,1,2-tribromoethane. The polymerization reaction time may be varied over a wide range. In accordance with this invention polymerization reactions may be carried out using various times between about five minutes and several hours with no apparent detrimental effects under conditions where a prolonged reaction time is required or desired.

Thi high molecular weight polymers obtained in accordance with this invention may be separated from the polymerization reaction mass by standard procedures such as quenching the molten reaction mixture in a polymer nonsolvent such as methanol, water or carbon tetrachloride or the mass may be cooled, ground, and if necessary washed. The per cent of conversion may be considerably varied in accordance with this invention with conversions as high as 96% having been obtained. Moreover, the polymers may be obtained with specific viscosities, at 50° C. of a 1% cyclohexanone solution of the polymer, of between about 0.3 and 4.0 and even greater, thus showing that polymers having molecular weights in excess of 10,000 and much greater are obtainable.

From the foregoing, it is evident that there are numerous factors which will influence conditions for the most satisfactory operation of this invention, the actual requirements of which can be determined only by a detailed study of each set of starting materials and the intermediate and the finished products desired.

For example, although the invention has been particularly demonstrated for the preparation of 3,3-bis(chloromethyl)oxetane as the preferred material, other 3,3-disubstituted oxetanes such as 3,3-bis(fluoromethyl)oxetane, 3,3-bis(bromomethyl)oxetane, 3 - chloromethyl-3-methyl-oxetane, 3,3-dimethyloxetane, and 3,3-bis(phenoxymethyl)oxetane may be similarly polymerized. Moreover, the properties of the end products may be modified by copolymerization of any of the above monomeric materials with each other or with other copolymerizable monomers such as oxetane, and other substituted oxetanes. Additionally, antioxidants, stabilizers, plasticizers and various other additives such as fillers, pigments or other colorants may be incorporated with the polymers obtained in accordance with this invention. The specific materials utilized and their method of incorporation will, of course, depend on the intermediate and the finished products desired and, in general, additive incorporation may take place with the monomers, comonomers or prepolymers as well as the end product polymers.

The advantages of this invention over processes heretofore known in the art are multifold. The invention opens the way to a cheaper and more flexible process for preparing polymers of 3,3-disubstituted oxetanes and, particularly, those having molecular weights in excess of 10,000 which expressed in terms of specific viscosity as set forth herein means at least 0.3. Expensive refrigeration equipment for low temperature polymerization to obtain the high molecular weight polymers may be eliminated. In accordance with prior art procedures bulk polymerizations were not feasible for lack of consistent control, whereas with this invention bulk polymerizations are entirely satisfactory. Furthermore, with the use of fixed bed substantially insoluble catalysts, the necessity for aftertreatment of the finished polymer to remove impurities is reduced to a minimum and for some end product applications may be eliminated entirely. The operability of the invention within a wide temperature range allows great flexibility in choosing operating conditions to get the most desirable polymer properties, to control the rate of the reaction, and to get the most economical operating conditions.

Furthermore, the polymers produced in accordance with this invention are suitable for the various conventional thermoplastic uses such as molding to form various shaped articles; extrusion to form articles such as film, filaments, sheeting, strip and tubing; calendering to form film, sheeting and coating of paper or fabric; and laminating to form counter tops, industrial board and the like.

It will be seen, therefore, that this invention may be carried out by the use of various modifications and changes without departing from its spirit and scope.

What I claim and desire to protect by Letters Patent is:

1. In the method of polymerizing 3,3-disubstituted oxetane of the group consisting of 3,3-bis(halomethyl) oxetane, 3-chloromethyl-3-methyl oxetane, 3,3-dimethyl oxetane, and 3,3-bis(phenoxymethyl)oxetane, the improvement which comprises polymerizing said oxetane in the presence of at least one catalyst of the group consisting of aluminum hydride and aluminum amalgam at a temperature from about 100° C. to about 275° C., said catalyst being present in an amount sufficient to catalyze polymerization of said monomer to a polymer having a molecular weight of at least 10,000.

2. In the method of polymerizing 3,3-bis(chloromethyl) oxetane, the improvement which comprises polymerizing said oxetane in the presence of aluminum hydride catalyst at a temperature from about 100° C. to about 275° C., said catalyst being present in an amount sufficient to catalyze polymerization of said monomer to a polymer having a molecular weight of at least 10,000.

3. In the method of polymerizing 3,3-bis(chloromethyl) oxetane, the improvement which comprises polymerizing said oxetane in the presence of aluminum amalgam catalyst at a temperature from about 100° C. to about 275° C., said catalyst being present in an amount sufficient to catalyze polymerization of said monomer to a polymer having a molecular weight of at least 10,000.

4. The method according to claim 2 in which the aluminum hydride catalyst is present in an amount of from about 25 to about 10,000 p.p.m. by weight of said oxetane.

5. The method according to claim 3 in which the aluminum amalgam catalyst is present in an amount of from about 25 to about 10,000 p.p.m. Hg by weight of said oxetane.

No references cited.